United States Patent [19]

Kulka

[11] Patent Number: 5,223,767
[45] Date of Patent: Jun. 29, 1993

[54] LOW HARMONIC COMPACT FLUORESCENT LAMP BALLAST

[75] Inventor: Raymond J. Kulka, Chicago, Ill.

[73] Assignee: U.S. Philips Corporation, New York, N.Y.

[21] Appl. No.: 796,156

[22] Filed: Nov. 22, 1991

[51] Int. Cl.$^5$ .............................................. H05B 37/02
[52] U.S. Cl. ................................ 315/209 R; 315/205; 315/DIG. 7; 315/307
[58] Field of Search ............ 315/209 R, 209 CD, 205, 315/DIG. 7, 291, 307

[56] References Cited

U.S. PATENT DOCUMENTS

| | | | |
|---|---|---|---|
| 4,935,672 | 6/1990 | Lanmers | 315/DIG. 7 |
| 4,952,842 | 8/1990 | Bolhuis | 315/DIG. 7 |
| 4,965,493 | 10/1990 | Van Meurs | 315/DIG. 5 |
| 4,994,717 | 2/1991 | Moon | 315/209 R |
| 5,057,749 | 10/1991 | Nilssen | 315/209 R |
| 5,117,161 | 5/1992 | Avrahami | 315/209 R |

*Primary Examiner*—Robert J. Pascal
*Assistant Examiner*—R. A. Ratliff
*Attorney, Agent, or Firm*—Bernard Franzblau

[57] ABSTRACT

A high frequency electronic ballast for a lamp (20) includes an LC filter (5) and a voltage doubler circuit (8) coupling AC input terminals (1, 2) to DC input terminals (13, 14) of a half bridge DC/AC converter circuit (15). One end of the lamp is coupled to the capacitors (16, 17) of the voltage doubler circuit via a coupling capacitor (21) and the voltage doubler diodes (11, 12) and the other end of the lamp is coupled via an LC circuit (24, 25 and 26) to a junction point (22) between first and second switching transistors (18, 19) of the half bridge circuit. A capacitor including the lamp and the LC circuit so that the half bridge circuit will oscillate at a high frequency. Energy is fed back to the voltage doubler capacitors via the coupling capacitor and the LC circuit to maintain the capacitor voltage above the peak of the AC supply voltage and thereby provide a circuit with a high power factor and low harmonic line current.

20 Claims, 1 Drawing Sheet

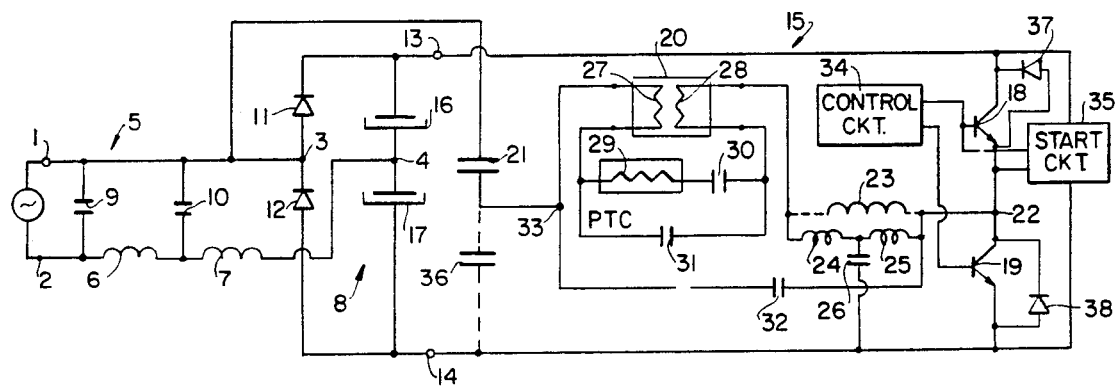

LOW HARMONIC COMPACT FLUORESCENT LAMP BALLAST

BACKGROUND OF THE INVENTION

This invention relates to a high frequency electronic ballast apparatus including a DC/AC converter for igniting and operating a gas discharge lamp. More particularly, the invention relates to such an electronic ballast employing a half bridge converter which provides a high power factor and a substantial reduction in the total line harmonic distortion relative to known electronic ballasts.

Various electronic circuits are known for energizing and ballasting electrical discharge lamps. It is also known that DC/AC converters of the half bridge type operating at high frequencies can be used for this purpose. U.S. Pat. No. 4,952,842 (Aug. 28, 1990) provides one example of a prior art DC/AC converter. In order to prevent premature ignition of the gas discharge lamp before the lamp electrodes achieve normal operating temperature, a capacitor is connected in series with an induction coil and the discharge lamp. This capacitor is shunted by a switching element which provides improved ignition of the discharge lamp and thus extends the useful life of the lamp.

Another prior art half bridge high frequency DC/AC converter is shown in U.S. Pat. No. 4,965,493 (Oct. 23, 1990). This converter circuit is designed to suppress charge current peaks in a buffer capacitor without using special filters. This is accomplished by charging the buffer capacitor to a voltage exceeding the peak value of the 60 Hz AC supply voltage for the apparatus. In addition to the first and second semiconductor switching elements of the half bridge DC/AC converter, the electronic ballast arrangement includes a third semiconductor switching element which is made to conduct for a given interval at the start of each period of the high frequency cycle of the converter. Thus, non-sinusoidal current waveforms which comply with government standards as to line current distortion are achieved by adjusting the conductance time of the third semiconductor switching element. A trapezoidal line current waveform is preferred. The energy flow through the load circuit is controlled by means of the duty cycle of the third semiconductor switching element. When the first semiconductor switching element is conductive and the third semiconductor switching element is cut-off, energy flows from the AC power supply lines. If the third semiconductor switching element is conductive, the energy is taken from the buffer capacitor. The duty cycle is adjusted so that a trapezoidal line current is produced.

U.S. Pat. No. 4,935,672 (June 19, 1990) illustrates a further high frequency half bridge DC/AC converter in which the control circuit for one semiconductor switching element includes an LC resonant circuit and which further includes a diode coupling the control circuit of the other semiconductor switching semiconductor switching element whereby the switching of the semiconductor switching elements is synchronized in a simple manner and without the use of a voluminous and costly transformer.

In order to limit the harmonic currents injected into the AC supply lines, it is desirable that the AC line current have a continuous symmetrical waveform, such as a sinusoidal current wave. It has been determined that known half bridge converters produce AC line currents with a high harmonic content because of the electrolytic buffer capacitor connected to the output of a diode bridge rectifier which is usually present between the 60 Hz AC supply lines and the DC input terminals of the converter. When the output voltage of the bridge rectifier is lower than the voltage on the buffer capacitor, there is no current flow, an important factor in the poor harmonics characteristic of such a circuit. This type of converter circuit also exhibits a poor power factor.

It has been suggested that in order to avoid the zero current period, a bypass path should be provided around the buffer capacitor to ensure a continuous current flow into and out of the AC supply terminals. This can be implemented by the addition of some diodes and capacitors in a manner such that the half bridge DC/AC converter draws a nearly sinusoidal input current. The basic circuit consists of a self-driven half bridge converter operating at a high frequency to energize a discharge lamp. The circuit is supplied from a rectified AC line voltage via a bridge rectifier. A diode is provided in order to isolate the upper half bridge capacitor from the main storage capacitor. This diode also isolates the main storage capacitor from the bridge rectifier. Energy from a resonant circuit in the DC/AC converter is capacitively coupled through the isolating diode to boost the voltage on the main storage capacitor. By a proper choice of components, a current is supplied to the load circuit (discharge lamp) even when the instantaneous line voltage is below the voltage on the main capacitor. Thus, a current is drawn from the AC supply lines over the whole period of the AC line voltage, which provides a high power factor and low harmonics. It is also possible to substitute a voltage doubler circuit at the input in place of the bridge rectifier.

A half bridge high frequency inverter circuit operating on the Striker principle, i.e. charging the electrolytic buffer capacitor to the level of the AC supply voltage in order to prevent the flow of peak line currents, is shown and described in EP 0,244,644 A1 by Fahnrich et al.

Another known technique for achieving a high power factor and low line current harmonics in a half bridge DC/AC converter utilizes a boost converter preconditioner stage. A disadvantage of this approach is the significantly higher cost and increased size of the resultant device.

SUMMARY OF THE INVENTION

It is therefore an object of the present invention to provide a DC/AC converter circuit for operating discharge lamps with low line harmonic distortion and with a high power factor.

It is a further object of the invention to provide a low harmonic, high power factor, half bridge DC/AC converter with an improved lamp current crest factor.

Another object of the invention is to improve the operation of a high frequency half bridge DC/AC converter by means of a relatively simple and inexpensive modification.

A still further object of the invention is to provide a high frequency self-oscillating DC/AC converter that achieves good power factor and line harmonic performance with a minimum of additional cost in comparison with a conventional half bridge converter.

These and other objects and advantages of the invention are achieved by the provision of a self-oscillating high frequency DC/AC half bridge converter which comprises a filter circuit and a voltage doubler circuit for coupling the lines of a low frequency (60 Hz) AC supply voltage to a pair of DC input terminals of the half bridge converter. The voltage doubler includes a pair of electrolytic capacitors connected in series circuit to the DC input terminals and a pair of series connected diodes in parallel therewith. The converter circuit also includes first and second switching transistors connected in a second series circuit across the DC input terminals. The discharge lamp is coupled to a junction of the series connected diodes via a coupling capacitor and to a junction between the series connected switching transistors via an LC circuit that provides a voltage boosting function for the pair of electrolytic capacitors. This circuit effectively splits the energy feedback to the electrolytic capacitors, part of it coming from the discharge lamp and part of it from the LC circuit.

By means of a proper choice of components, the half bridge converter circuit will operate like a high frequency boost converter so as to raise the voltage on each of the electrolytic buffer capacitors to a value above the peak value of the AC supply line voltage. High capacitor charging currents from the AC line voltage source are therefore avoided, which promotes a high power factor and low line current harmonic content.

Another advantage of the invention is that the input current to the buffer capacitors is now partially derived from the high frequency half bridge converter circuit instead of being totally supplied by the low frequency (60 Hz) AC supply voltage. As a result, smaller buffer capacitors can now be used for a given low value of ripple voltage.

In addition, as a result of the improved power factor, the new circuit consumes less current from the AC supply lines than does an equivalent circuit that is without the novel features described above and below.

BRIEF DESCRIPTION OF THE DRAWING

A preferred embodiment of the invention will now be described in more detail, by way of example, with reference to the accompanying drawing which shows a circuit diagram of the high frequency electronic ballast arrangement.

DESCRIPTION OF THE PREFERRED EMBODIMENTS

Referring now to the drawing, a low frequency AC supply voltage, for example 120 volts, 60 Hz, is supplied to a pair of AC input terminals 1, 2 which are coupled to an EMI filter 5 consisting of a first capacitor 9 and a first inductor 6. The EMI filter is in turn coupled to the input terminals 3, 4, of a voltage doubler circuit 8 via a second inductor 7 and a second capacitor 10. The first and second inductors 6 and 7 are serially connected between AC supply terminal 2 and the input terminal 4 of the voltage doubler circuit 8. The first capacitor 9 is coupled across input terminals 1, 2 and the second capacitor 10 is connected between terminal 1 and the junction point between the inductors 6 and 7.

The voltage doubler circuit consists of a pair of diodes 11, 12 serially connected across the DC input terminals 13, 14 of a high frequency DC/AC half bridge converter 15. The connected buffer capacitors 16, 17 coupled in parallel with the series connected diodes 11, 12.

A pair of series connected switching transistors 18 and 19 are coupled to the DC supply terminals 13, 14. Third and fourth diodes 37 and 38 are coupled with reverse polarity across transistors 18 and 19, respectively. One end of a discharge lamp 20, for example, a fluorescent lamp, is coupled via a capacitor 21 to the junction point 3 of the diodes 11, 12. It is known to connect the other end of the discharge lamp 20 to the junction 22 between the switching transistors 18, 19 via an inductor 23. This known connection is shown by means of dashed lines in the drawing. However, in accordance with the invention, in place of the single inductor 23 there is now connected an circuit consisting of first and second series connected inductors 24 and 25 with a common junction therebetween coupled to the DC input terminal 14 via a capacitor 26 .

The electrodes 27 and 28 of the discharge lamp are interconnected via the series connection of a positive temperature (PTC) resistor 29 and a capacitor 30. A further capacitor 31 is connected in parallel with the series connection PTC resistor and the capacitor 30. The PTC resistor a preheat current path for heating the lamp electrodes pr to lamp ignition. This is a conventional pre-heat circuit.

A snubber capacitor 32 connects the junction 22 to a further junction point 33 and operates to reduce losses in the switching transistors.

A conventional control circuit 34 alternately drives the switching transistors 18 and 19 on and off in a manner such that when one transistor is on the other is off, and vice versa. The circuit could be I.C. driven, but is preferably a the load circuit connected between junction 22 and 33 and could consist of a transformer having a winding in series with inductors 24 and 25 and properly first and second secondary windings coupled to the base and emitter electrodes of the switching transistors 18 and 19, respectively. Respective resistors may be connected in series wit secondary windings in the base circuits of the transistors this way, a self-oscillating high frequency DC/AC converter can be achieved. The precise method of driving the switching transistors is not critical to the invention and various other methods for the transistors are available and would provide satisfactory operation of the circuit.

The lamp 20, capacitor 31, inductors 24, 25 and capacitor 26 essentially make up a resonant circuit which allows the half bridge inverter to self-oscillate at a high frequency.

A start circuit 35 may be provided in order to initiate operation of the high frequency inverter 15. The details of this circuit are also conventional and well known in the prior therefore will not be further described.

The input current from the AC supply is a very close approximation of a sinusoidal waveform because of the voltage boosting action via capacitor 21 and isolating diodes 11, 12 which provide a high frequency path for the resonant energy in the lamp circuit to return to the electrolytic buffer capacitors 16, 17 and thereby ensure that the voltage across each of these capacitors is always higher than the line voltage from the AC supply at terminals 1, 2. The capacitor 10 and the inductor 7 are a part of the voltage booster circuit for the buffer capacitors. Energy returning from the resonant circuit via the capacitor 21 is operative to develop a voltage across the inductor 7. This voltage is added to the AC line voltage and will to ring to a higher voltage than the buffer capacitor voltage, but will be clamped by a respective one of the diodes 12 to the buffer capacitor voltage. Thus, energy is returned through the diodes 11, 12 to the buffer capacitors. An additional voltage boosting action for buffer capacitors 16 and 17 is provided by the LC circuit made up of inductor 25 and capacitor 26. By the use of the LC circuit in place of a single inductor such as the inductor 23, we effectively split the feedback energy supplied to the capacitors 16, 17, a part of which is derived from the lamp via capacitor 21 and another part of which is derived from the LC circuit 24, 25 and 26. The diodes 37 and 38 provide a path to return energy to the buffer capacitors. In the case where a transformer is used to drive the transistors 18 and 19, the diodes 37 and 38 can be eliminated since the secondary windings and the collector-base junctions of the transistors provide a low impedance path for the return of energy to the buffer capacitors. The collector-base junctions of the transistors then provide the diodes' function.

A further voltage boosting operation is provided by the inductor 7 which operates as a sort of voltage source that drives current through the isolating diodes 11 and 12 into the capacitors 16, 17.

In a further modification of the circuit, a capacitor 36 may be connected between junction point 33 and input terminal 14. By a proper choice of the capacitors 21 and 36, the half bridge inverter circuit will act like a high frequency boost converter to raise the voltage on each of the buffer capacitors 16 and 17 to a value above the peak line voltage. This avoids any high capacitive charge currents from the line voltage supply and thereby provides an improvement in the circuit power factor and a reduction in line current harmonics. In view of the improved power factor, the circuit draws a much lower input current.

As mentioned above, since the input ripple current into capacitors 16 and 17 is now partially derived from the high frequency half bridge circuit rather than being entirely derived from the low frequency (60 Hz) AC supply, smaller capacitors can now be used and still maintain low ripple voltage.

Although the invention has been described in connection with a preferred embodiment thereof, it will be apparent to those skilled in the art that various modifications and changes can be made in the apparatus of this invention without departing from the true scope and spirit thereof, as defined above and in the appended claims.

We claim:

1. A high frequency DC/AC converter for operation of an electric discharge lamp comprising:
   a pair of AC input terminals for connection to a low frequency source of AC supply voltage,
   first and second DC input terminals for connection to a DC/AC converter circuit,
   a rectifier circuit including first and second diodes for coupling said AC input terminals to said DC input terminals,
   buffer capacitor means coupled to said DC input terminals,
   first and second switching transistors connected in a series circuit across said first and second DC input terminals,
   a resonant circuit including an electric discharge lamp, a first capacitor coupled to the discharge lamp, and an LC circuit coupling the discharge lamp to a first junction point between said first and second switching transistors,
   a second capacitor coupling the discharge lamp to the buffer capacitor means via at least one of said first and second diodes,
   means coupled to respective control electrodes of the first and second switching transistors for alternately driving said switching transistors into conduction and cut-off at a high frequency, and wherein
   said LC circuit is coupled to one of said DC input terminals.

2. A DC/AC converter as claimed in claim 1 wherein said LC circuit comprises first and second inductors connected in series circuit between one end of the discharge lamp and said first junction point and a third capacitor coupled between a junction point of said first and second inductors and said one DC input terminal.

3. A DC/AC converter as claimed in claim 2 wherein said buffer capacitor means comprises fourth and fifth capacitors connected in a series circuit to the DC input terminals and said first and second diodes are connected in a second series circuit to said DC input terminals.

4. A DC/AC converter as claimed in claim 3 further comprising an LC filter circuit coupled between the pair of AC input terminals and second and third junction points between the first and second diodes and between the fourth and fifth capacitors, respectively.

5. A DC/AC converter as claimed in claim 3 further comprising second and third junction points between the first and second diodes and between the fourth and fifth capacitors, respectively, and a third inductor and a sixth capacitor serially connected between said second and third junction points to provide a path for energy flow from said resonant circuit to the fourth and fifth capacitors.

6. A DC/AC converter as claimed in claim 2 wherein said first capacitor is connected in parallel with the discharge lamp.

7. A DC/AC converter as claimed in claim 6 wherein said buffer capacitor means comprises fourth and fifth capacitors connected in a series circuit to the DC input terminals and said first and second diodes are connected in a second series circuit to said DC input terminals such that said first and second diodes and said fourth and fifth capacitors form a voltage doubler circuit coupled to said pair of AC input terminals, and wherein
   said second capacitor is connected between one end of the discharge lamp and a junction point between the first and second diodes.

8. A DC/AC converter as claimed in claim 7 wherein said discharge lamp comprises a fluorescent lamp having electrodes interconnected via a positive temperature coefficient resistor so as to provide a pre-heat current path for said electrodes.

9. A DC/AC converter as claimed in claim 7 further comprising a sixth capacitor coupled between said first junction point and said one end of the discharge lamp.

10. A DC/AC converter as claimed in claim 1 wherein said means for alternately driving the switching transistors is responsive to a current flowing through the discharge lamp.

11. A DC/AC converter as claimed in claim 1 wherein said LC circuit comprises a first inductor and a third capacitor connected in series between said first junction point and said one DC input terminal, said converter further comprising a second inductor and a fourth capacitor serially connected to said first and second diodes and to said buffer capacitor means.

12. A high frequency circuit for operation of an electric discharge lamp comprising:
   a pair of AC input terminals for connection to a low frequency source of AC supply voltage,
   first and second DC input terminals for connection to a DC/AC converter circuit,
   a rectifier circuit and buffer capacitor means connected together and to said pair of AC input terminals and to said first and second DC input terminals, and
   a high frequency DC/AC converter circuit coupled to said first and second DC input terminals and comprising:
      first and second switching transistors coupled to said first and second DC input terminals and to a discharge lamp in a manner whereby the first and second switching transistors supply a high frequency AC current to the discharge lamp, a first capacitor for coupling a first terminal of the discharge lamp to the buffer capacitor means via at least a part of the rectifier circuit and a first inductor coupled to a second terminal of the discharge lamp and to said switching transistors so as to supply high frequency energy to the buffer capacitor means.

13. A high frequency circuit as claimed in claim 12 further comprising:
   a second capacitor for coupling the first inductor to said buffer capacitor means such that the high frequency energy supplied to the buffer capacitor means from the first inductor comprises a current path that includes the first and second switching transistors and the second capacitor.

14. A high frequency circuit as claimed in claim 13 wherein said rectifier circuit comprises first and second series connected diodes with a junction point therebetween connected to the first capacitor, and wherein the high frequency energy supplied to the buffer capacitor means from the first inductor boosts the voltage across the buffer capacitor means to a voltage level above the instantaneous level of an AC supply voltage at the AC input terminals.

15. A high frequency circuit as claimed in claim 12 wherein a second inductor is coupled to one of said AC input terminals and to said buffer capacitor means such that the buffer capacitor means receive a charge current from the AC input terminals via the second inductor and the rectifier circuit.

16. A high frequency circuit as claimed in claim 13 wherein a second inductor is coupled to one of said AC input terminals and to said buffer capacitor means such that the buffer capacitor means receive a charge current from the AC input terminals via the second inductor and the rectifier circuit, a further charge current for the buffer capacitor means being supplied by a current flow through the first inductor and via the second capacitor and the switching transistors.

17. A high frequency circuit as claimed in claim 13 wherein said rectifier circuit and said buffer capacitor means are connected together and to said pair of AC input terminals so as to operate as a voltage booster circuit.

18. A high frequency circuit as claimed in claim 12 that further comprises a second capacitor for coupling across terminals of a discharge lamp.

19. A high frequency circuit as claimed in claim 13 wherein the first inductor is coupled to the second terminal of the discharge lamp via a second inductor, said high frequency DC/AC converter further comprising a third capacitor coupling a junction point of the first and second switching transistors to a second junction point between the first terminal of the discharge lamp and the first capacitor.

20. A high frequency circuit as claimed in claim 13 wherein the buffer capacitor means comprise third and fourth capacitors connected in a series circuit to the DC input terminals and the rectifier circuit comprises first and second diodes connected in a second series circuit to said DC input terminals, and wherein a second inductor is coupled between a junction point of the third and fourth capacitors and a junction point of the first and second diodes via a fifth capacitor.

* * * * *